Aug. 15, 1950
A. SIMMON
2,518,947
CONTROL DEVICE FOR PHOTOGRAPHIC COLOR PRINTERS AND ENLARGERS
Filed June 22, 1948
9 Sheets-Sheet 1
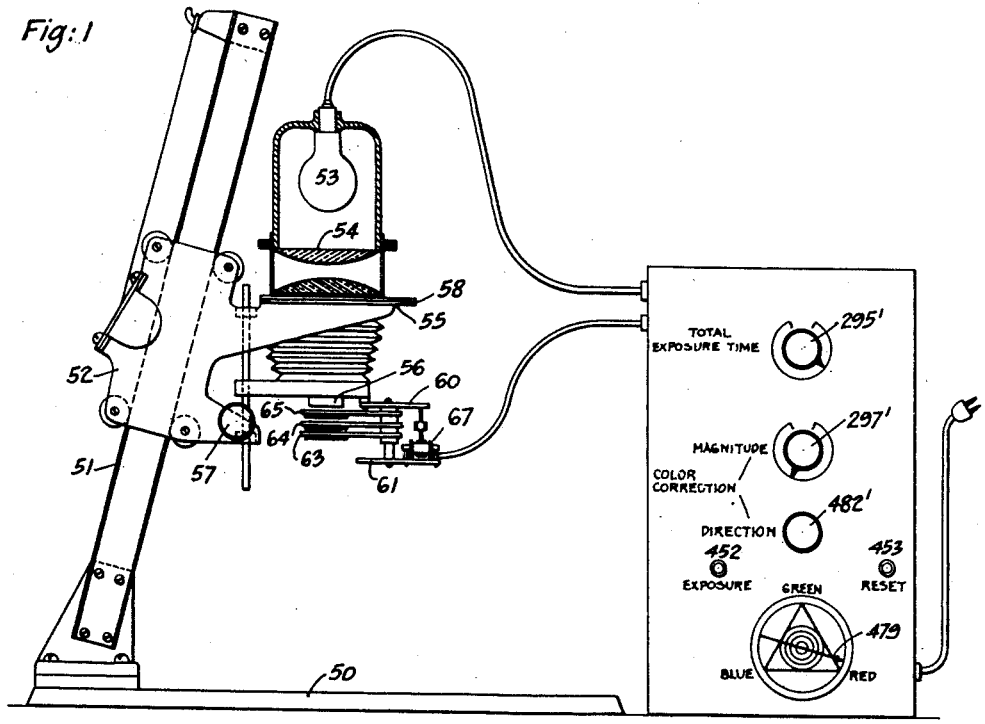
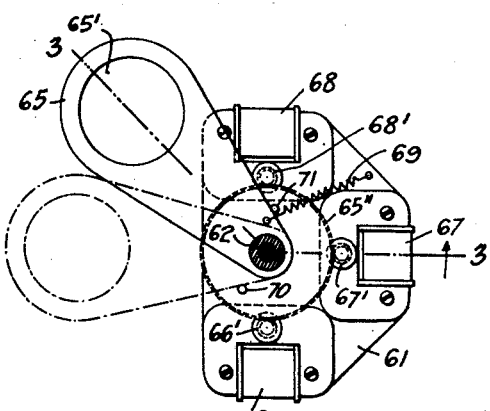
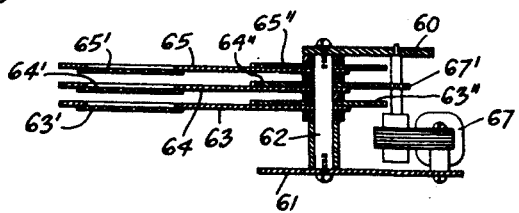
INVENTOR:
Alfred Simmon
BY Walter E. Wollheim
ATTORNEY.

Aug. 15, 1950 A. SIMMON 2,518,947
CONTROL DEVICE FOR PHOTOGRAPHIC
COLOR PRINTERS AND ENLARGERS
Filed June 22, 1948 9 Sheets-Sheet 2
Fig: 4
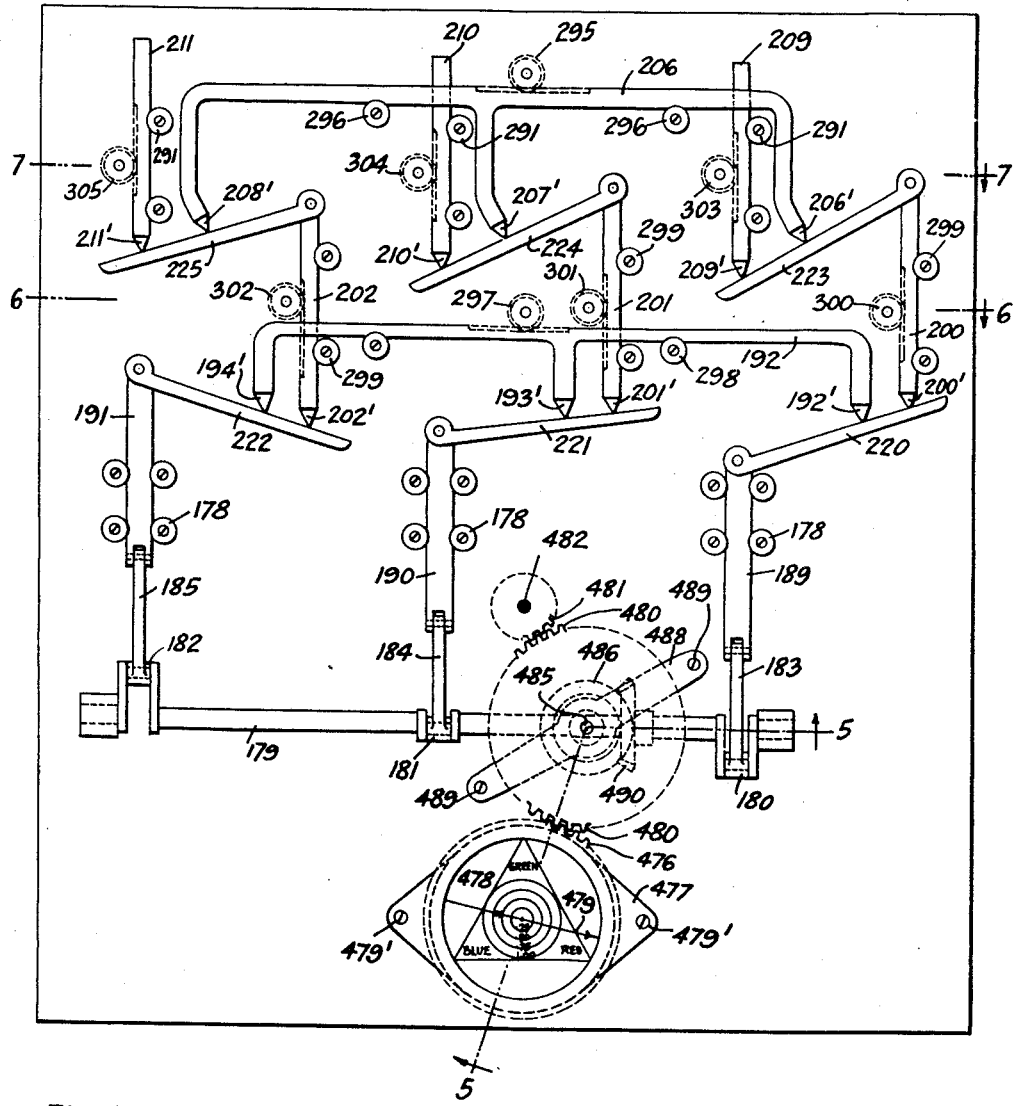
Fig: 5
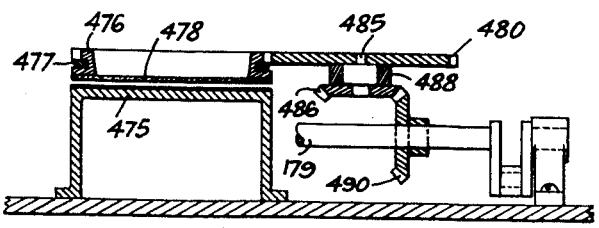
INVENTOR:
Alfred Simmon
BY
Walter E. Wollheim
ATTORNEY.

Fig:6
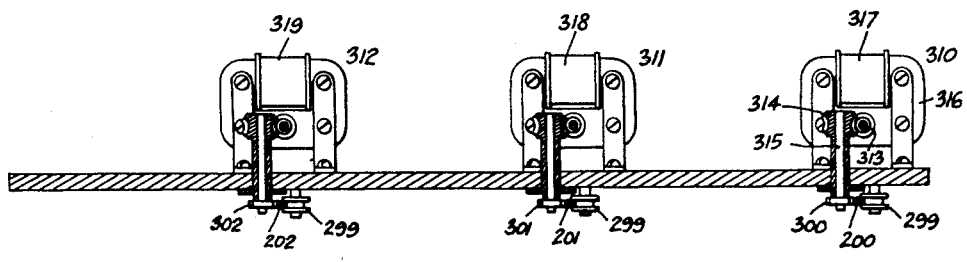
Fig:7
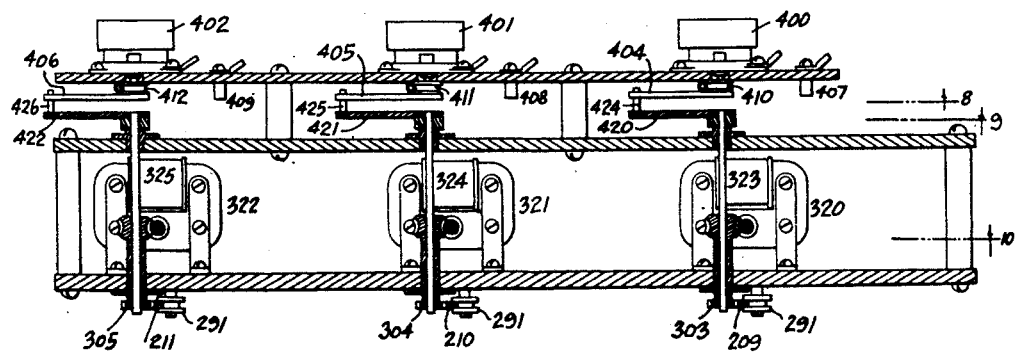
INVENTOR:
Alfred Simmon
BY Walter E. Wallheim
ATTORNEY.

Aug. 15, 1950     A. SIMMON     2,518,947
CONTROL DEVICE FOR PHOTOGRAPHIC
COLOR PRINTERS AND ENLARGERS
Filed June 22, 1948     9 Sheets-Sheet 4
Fig. 8
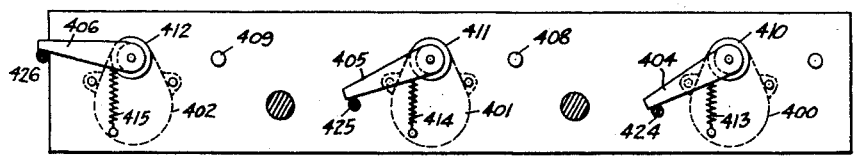
Fig: 9
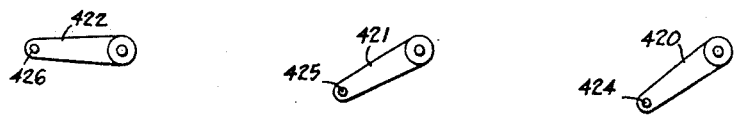
Fig: 10
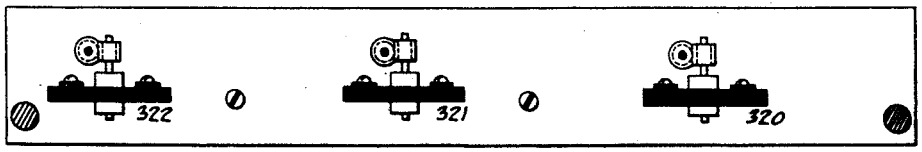
INVENTOR:
Alfred Simmon
BY Walter E. Wollheim.
ATTORNEY.

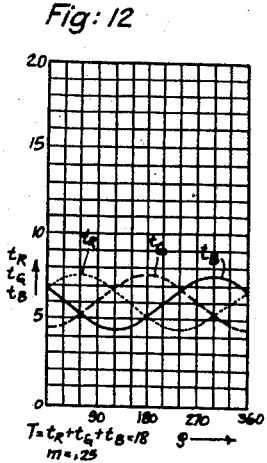
Fig: 12
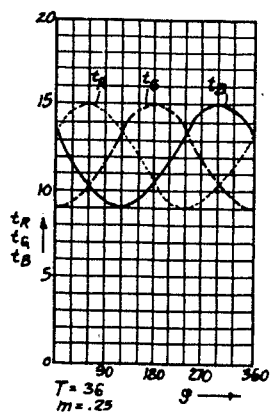
Fig: 13
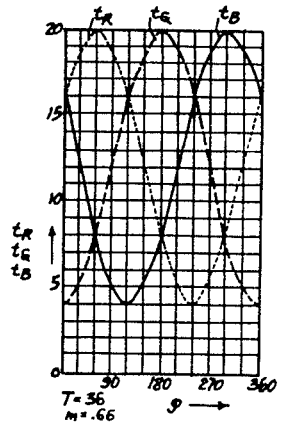
Fig: 14
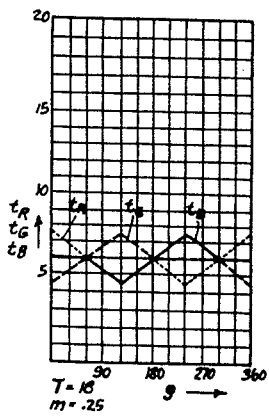
Fig: 15
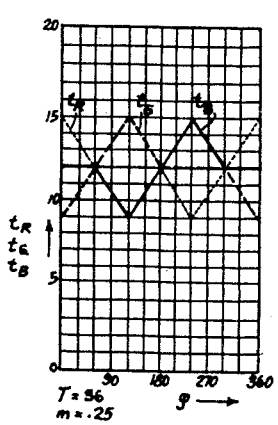
Fig: 16
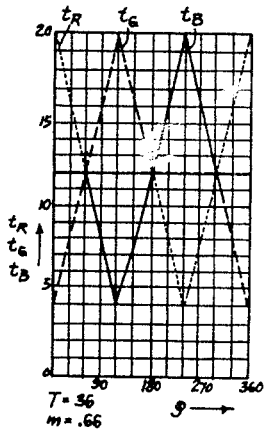
Fig: 17
INVENTOR:
Alfred Simmon
BY Walter S. Wollheim
ATTORNEY.

Aug. 15, 1950
A. SIMMON
2,518,947
CONTROL DEVICE FOR PHOTOGRAPHIC
COLOR PRINTERS AND ENLARGERS
Filed June 22, 1948
9 Sheets-Sheet 7
Fig:18
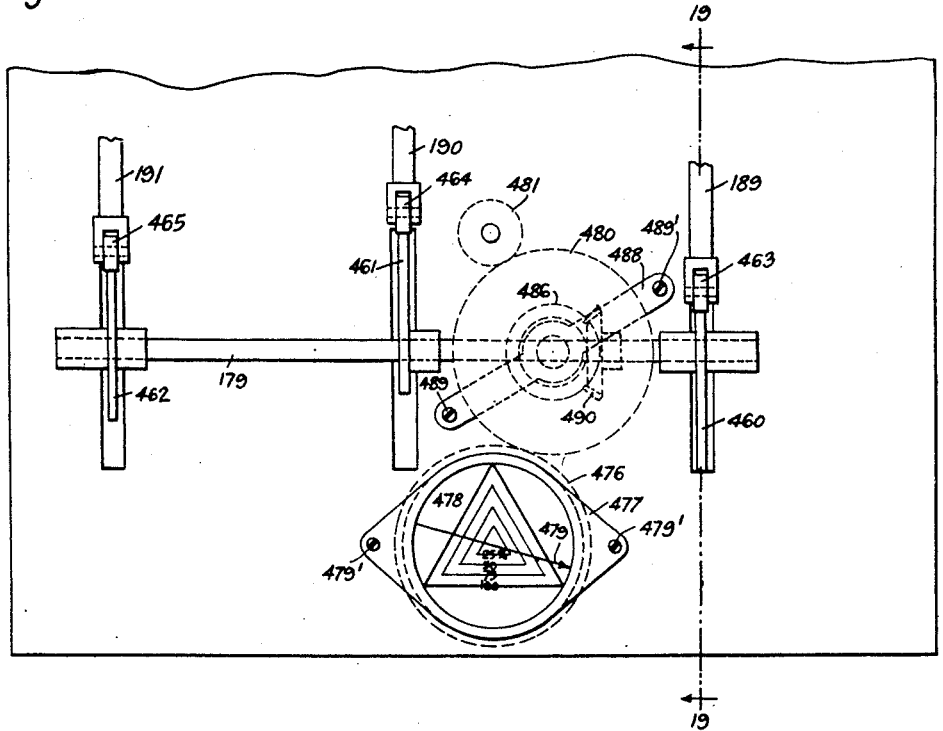
Fig:19
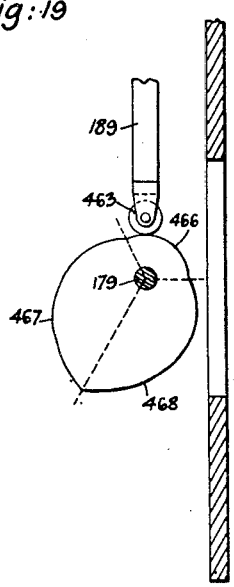
INVENTOR:
Alfred Simmon
BY Walter E. Wollheim
ATTORNEY.

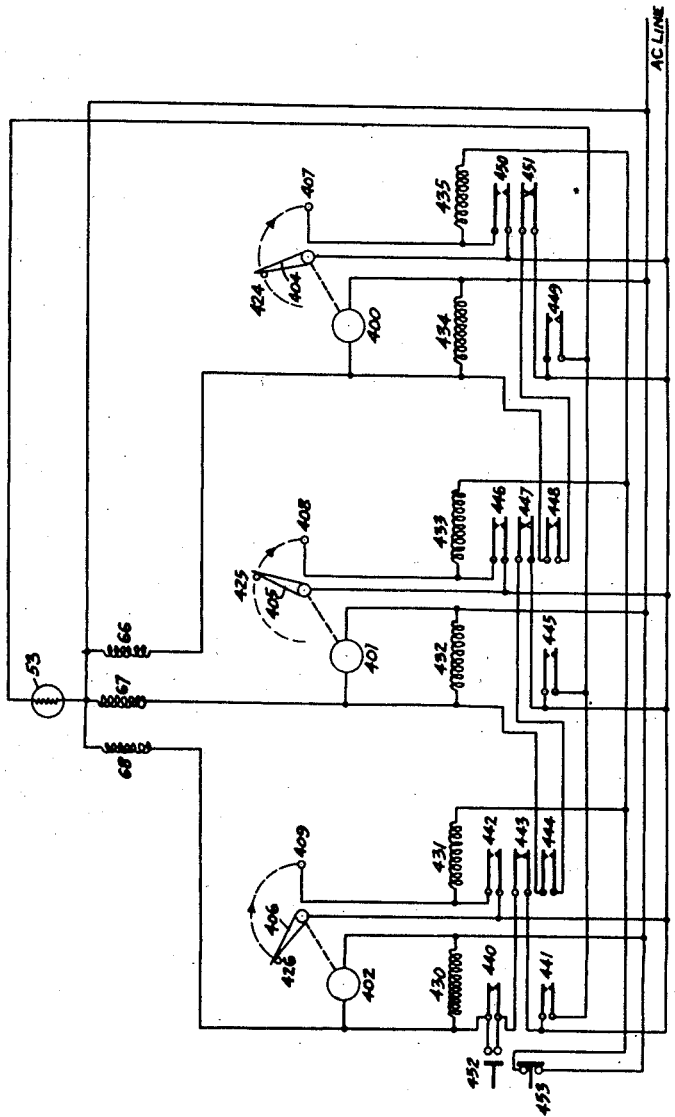

Patented Aug. 15, 1950

2,518,947

UNITED STATES PATENT OFFICE 2,518,947

CONTROL DEVICE FOR PHOTOGRAPHIC COLOR PRINTERS AND ENLARGERS

Alfred Simmon, Jackson Heights, N. Y., assignor to Simmon Brothers, Inc., Long Island City, N. Y., a corporation of New York Application June 22, 1948, Serial No. 34,387

11 Claims. (Cl. 88—24)

The object of this invention is a control device for photographic color printers and enlargers. More specifically, this invention refers to the type of printers or enlargers which expose color print material to three consecutive exposures of light of three different colors. A preferred embodiment of this invention is shown in the attached drawings, in which:

Fig. 1 illustrates a typical photographic enlarger equipped with this invention;

Figs. 2 and 3 show a filter unit, Fig. 3 being a cross-sectional view in the plane of line 3—3 in Fig. 2;

Fig. 4 shows the main unit after the front panel has been removed revealing details of a mechanical computing device;

Figure 11:
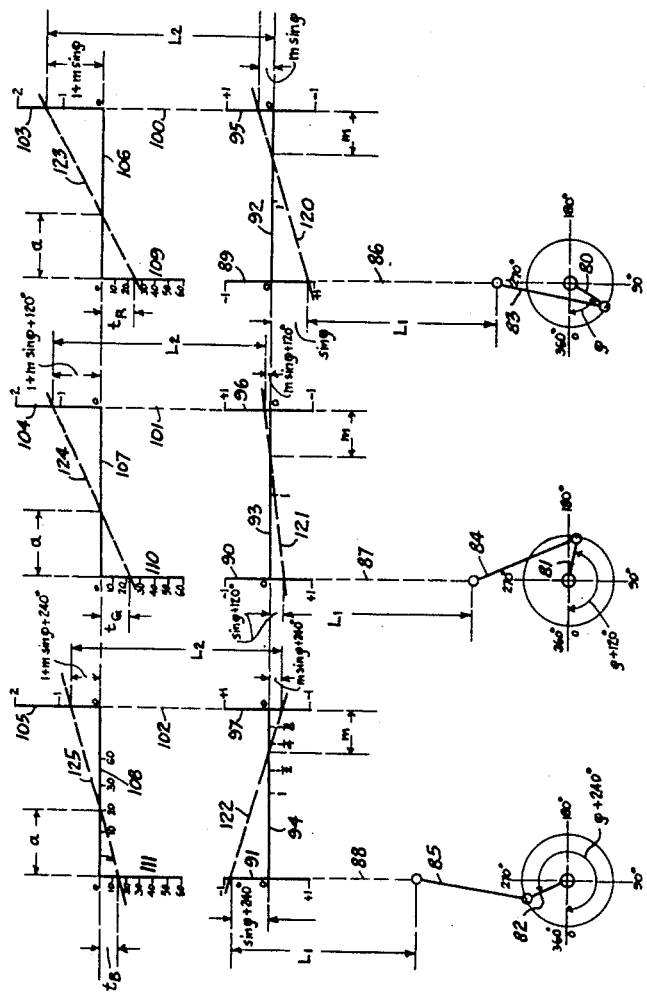
Figure 20:
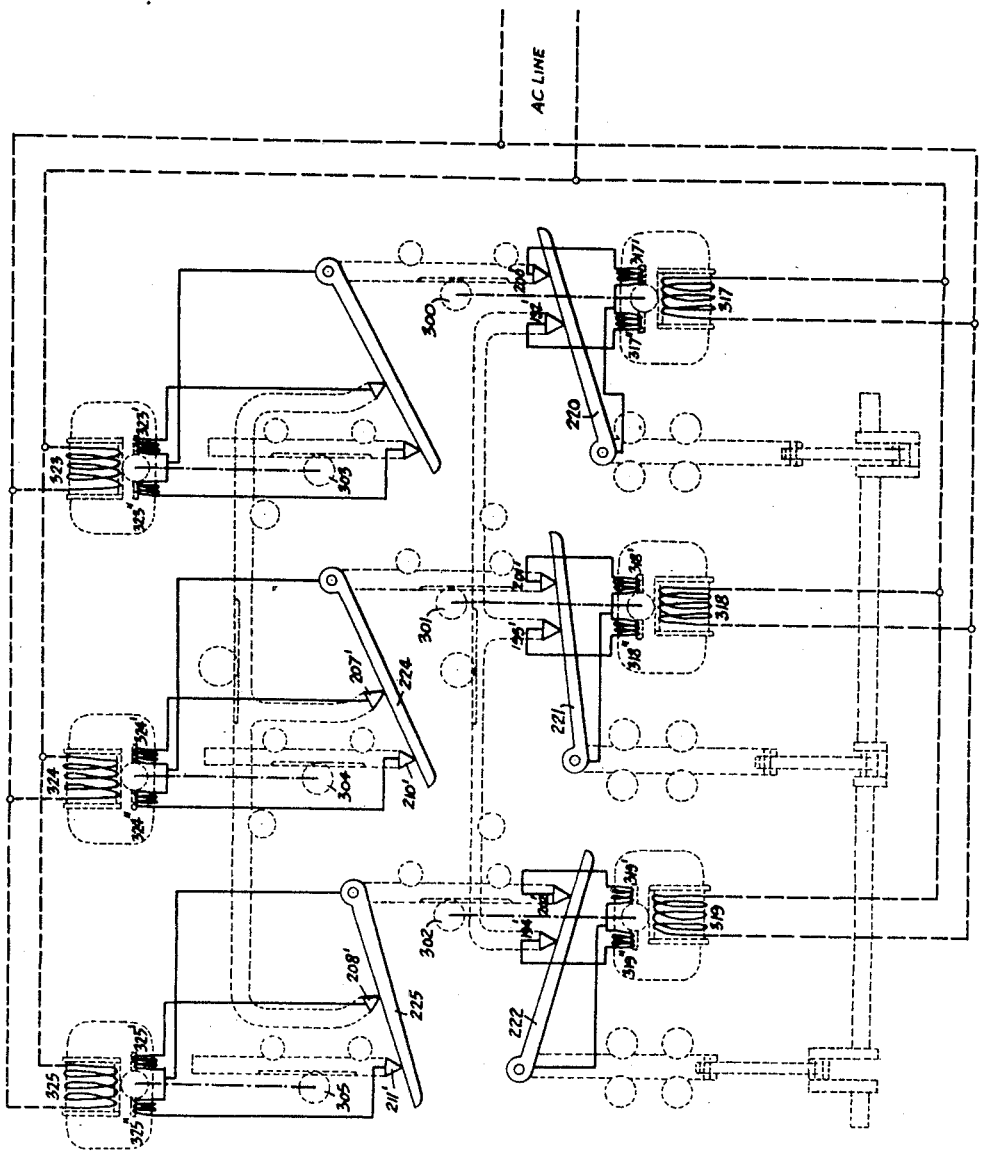

Figs. 5, 6 and 7 are cross-sectional views along the planes, respectively, of lines 5—5, 6—6 and 7—7 in Fig. 4; Fig. 5 shows a gear drive for a crank shaft forming part of the computing device and for an indicating device associated with said computing device; Fig. 6 shows three servomotors which actuate certain parts of the computing device; and Fig. 7 shows three other servomotors which actuate certain other parts of the computing device as well as three time switches operatively connected therewith;

Figs. 8, 9 and 10 are cross-sectional views along the planes of lines 8—8, 9—9 and 10—10 in Fig. 7; Figs. 8 and 9 show details of the time switches, and Fig. 10 shows a vertical cross-sectional view through the three servomotors shown in Fig. 7;

Fig. 11 is a mathematical diagram explaining the relations of the various parts of the computing device;

Figs. 12, 13 and 14 show the three individual exposure times of the three time switches as functions, respectively, of three variables, a sinusoidal relationship between the three exposure times being assumed;

Figs. 15, 16 and 17 again show the three exposure times as the function of three variables, but in this case a triangular relationship between the three exposure times being assumed;

Figs. 18 and 19 show the lower half of the computing device as shown in Fig. 4 with the modifications necessary to put the triangular relationship into practice;

Fig. 20 is an electrical wiring diagram of the computing device; and

Fig. 21 is the electrical wiring diagram of the three time switches.

Like characters of reference denote similar parts throughout the several views and the following specification.

PRINCIPLE

Broadly, color prints may be made either by using light of a suitable spectral composition or by making three consecutive exposures with light of three different colors. This invention refers to the latter method.

Generally, the three exposure times will not be equal and by adjusting them, prints of any desired density and color character can be obtained. Three individually adjustable time switches were, for example, contemplated in Patent No. 2,438,303, issued March 23, 1948, in order to obtain the desired results. While such a scheme is theoretically feasible, it will be found in practice quite inconvenient because the adjustment of any one of the time switches does not only change the color of the subsequent print, but its overall density as well, and it therefore takes considerable skill and imagination on the part of the operator to arrive at a suitable setting of three independent time switches. It is the object of this invention to improve upon this condition by combining with the three time switches a computing device which enables the operator to set, not the three individual exposure times separately, but to adjust, first, the total exposure time, i. e., the sum of all three times, second, the direction of a necessary or desired color correction, depending upon which color has to be emphasized and which has to be suppressed, and third, the magnitude of such color correction, while keeping the total exposure time, i. e., the sum of the three exposure times, constant. In other words, color correction is treated as a vectorial magnitude which has direction as well as size, and its adjustment does no longer affect the overall density of the print, which can now be adjusted independently.

From the foregoing, it will be clear that in addition to a preferably electrically operated filter unit, this invention comprises a computing device and three time switches in operative relationship therewith. The computing device is adapted to be adjusted by three independent control means which control, respectively, the general density of the print, i. e., the total exposure time, the direction of a color correction, and its magnitude. According to the adjustment of these three control means, the computing device automatically computes the three exposure times which will satisfy the imposed conditions and automatically adjusts the three time switches accordingly. The time switches themselves are conventional, and as a matter of convenience, are controlled by an electric circuit which automatically performs three consecutive exposures with three different colors.

PRINTER

The printer may be of any convenient form or design, and, merely as a matter of example, I have shown a more or less conventional enlarger which may be used for this purpose. This enlarger comprises a base or easel 50 on which a supporting structure 51 is mounted. During the actual printing exposure, a sheet of sensitized color print material is placed on this easel. The supporting structure may be vertical or preferably slightly inclined as shown. Slidably arranged on this supporting structure is a carriage 52 which supports the projector. The main parts of this projector are a lamp 53, a condenser 54, a film stage 55, a lens 56 and a focusing movement 57. A transparency or a negative 58 can be placed on the film stage. The distance of the lens 56 from the transparency 58 can be adjusted in the usual manner by means of the focusing movement 57 which may, for example, comprise a rack and pinion movement operated by a small handwheel.

ELECTRICALLY OPERATED FILTER UNIT

This unit can be seen in Fig. 1 in front of the lens 56 and has been shown in greater detail in Figs. 2 and 3. It consists of an upper plate 60 and a lower plate 61, Fig. 3, which are connected by a stud 62. Rotatably mounted on this stud are three filter holders 63, 64 and 65. These filter holders have a usually circular aperture which is covered, respectively, by three filters 63', 64' and 65' in different colors, generally made from gelatin or the like. Each filter holder is attached, respectively, to a gear 63'', 64'' and 65''. These gears are engaged, respectively, by small pinions 66', 67' and 68' which are driven by small motors 66, 67 and 68. These motors are mounted on the base plate 61 and are of the type which can be stalled for a long period of time without excessively overheating. Each filter holder is biased by a small spring 69 and assumes therefore ordinarily a position shown in solid lines in Fig. 2. As soon as one of the motors, however, becomes energized, it will turn one of the filters in a counter-clockwise direction, Fig. 2, until it assumes the position shown in dotted lines. The movement of the filter in both directions is restricted, respectively, by two small pins 70 and 71.

COMPUTING DEVICE

The color correction can be expressed for the three exposure times with the three different colors, respectively, as $$mf(\varphi)$$
$$mf(\varphi+120°)$$
$$mf(\varphi+240°)$$

Here $m$ is a factor which denotes the magnitude of the color correction and $\varphi$ is an angle denoting its direction. The nature of the function by which the color correction depends upon $\varphi$ may be selected freely, but it is a necessary condition, if the total exposure time is intended to be independent of the magnitude and direction of the color correction, that $$mf(\varphi)+mf(\varphi+120°)+mf(\varphi+240°)=0$$

A number of such functions are conceivable and two represent themselves immediately as the most logical choices. The first is the sine function whereby the three color corrections become respectively $$m \sin\varphi,$$
$$m \sin(\varphi+120°)$$
$$m \sin(\varphi+240°)$$

Obviously, $$\sin\varphi+\sin(\varphi+120°)+\sin(\varphi+240°)=0$$

The other function contemplates a triangular relationship between the three color corrections. Each of these color corrections as expressed as a function of $\varphi$ would be zero for a period of 120°, would increase in a straight line to a maximum for the next 60°, would fall to a minimum for the next 120° and would return to zero at the end of the next 60°. Three functions of this type which are out of phase with each other by 120° will again satisfy the condition that the sum of the three color corrections is zero at all times.

In mechanical terms, both functions, of course, can be reproduced by cam controlled movements, but the sine function can also be reproduced with a very good degree of approximation by a crank movement provided the length of the connecting rod is relatively large compared to the radius of the crank.

With these terms for the color corrections, the three exposure times through the three filters which are usually in the three primary colors, red, green and blue, can be expressed as follows:

$$t_R=a(1+mf(\varphi))$$
$$t_G=a(1+mf(\varphi+120°))$$
$$t_B=a(1+mf(\varphi+240°))$$

In the preferred case of the sine function, the exposure times become $$t_R=a(1+m\sin\varphi)$$
$$t_G=a(1+m\sin(\varphi+120°))$$
$$t_B=a(1+m\sin(\varphi+240°))$$

It can be seen that the factor "$a$" affects all three exposure times proportionally, and its adjustment, therefore, changes the total exposure time, i. e., the sum of all three exposure times. Consequently, the adjustment of "$a$" has a direct bearing upon the overall density of the print, i. e., the print can be made, by adjusting "$a$," more or less dense, without affecting its color composition.

Graphs illustrating these relationships are shown in Figs. 12 to 17. Figs. 12, 13 and 14 show the three exposure times under the assumption of sinusoidal relationship. I have assumed that in Fig. 12, $a=6$ and $m=.25$; in Fig. 12, $a=12$, $m=.25$; in Fig. 14, $a=12$, $m=.66$. It can be seen that the adjustment of "$a$" changes all exposure times in proportion without affecting the color corrections percentagewise, compare Figs. 12 and 13. The adjustment of "$m$" changes the size of the color corrections in proportion to the whole exposure time without affecting the sum of all three exposure times, i. e., the total exposure time or the overall density of the subsequent print, comparison between Figs. 13 and 14.

The same relations are illustrated in Figs. 15, 16 and 17 for the triangular relationship of the three respective exposure times.

It is, therefore, the purpose of the computing device to compute $t_R$, $t_G$, and $t_B$ as functions of $a$, $m$ and $\varphi$, respectively, and it is theoretically unimportant what the detailed design is of said computing device. It may be of any of the numerous mechanisms known for this purpose, or the problem may be solved electrically by means of a suitable electrical network. Merely as a preferred type, I show in the following a system of mechanized and motorized nomographs which have been disclosed in detail in my copending application No. 713,610, now abandoned.

A nomograph comprises basically three graduated scales showing the numerical value of three variables, respectively. These three scales are so arranged that a straight line intersecting them coordinates three particular values of said three variables which satisfy an equation for which the nomograph was prepared. See, for example, "The Construction of Nomographic Charts" by F. T. Mavis—International Textbook Co., Scranton, Pa.—and "The Nomogram" by Allcock and Jones, Sir Isaac Pitman and Sons Ltd., London.

The mechanized nomographs used in my computing device consist each of three elements slidable in straight lines and representing, respectively, two known and one unknown magnitude. One of these elements carries a pivoted spring bias lever which represents the intersecting straight line and which is adapted to come in physical contact with two projections carried, respectively, by the two other elements. In this manner, the position of the two elements representing known magnitudes determines the position of the third element representing an unknown magnitude. In order to improve the operating conditions, and avoid objectionable friction which, under certain conditions, in mechanisms of this kind, can accumulate very rapidly, the "unknown" element is not driven simply by mechanical force exerted by the "known" elements, but by a follow up mechanism or servomotor. This servomotor may be of any of the many types known at the present time, but it must always be so arranged that it drives the "unknown" element in one or the other of two opposing directions, depending upon whether the pivoted lever carried by one of the elements fails to make contact with one or the other of the two other elements, and means must be provided to stop this movement and keep the "unknown" element stationary as soon as the pivoted lever carried by one of these elements is in contact with both of the two other elements. The direction in which the servomotor drives the "unknown" element if the pivoted lever is in contact with only one element, must, of course, be so chosen as always to restore this stationary condition. In a preferred embodiment of my invention I use an extremely simple reversible alternating current motor known as a shaded pole motor. This motor has a field coil which is permanently connected to a suitable source of alternating current and it has two shading coils which cause this motor to rotate in one or the other direction, depending upon which of the shading coil circuits is closed. If both shading coil circuits are open or if, preferably, both shading coil circuits are closed, the motor ceases to rotate and remains stationary. The advantage of closing the shading coils rather than opening them is the extreme simplicity of the electric circuit made possible by this expedient.

The pivoted lever mentioned above is made from current conducting material, preferably silver plated brass, and this lever is electrically insulated from its supporting element or, if the supporting element is made from metal, the entire supporting element with the pivoted lever is mounted on an insulating support. The lever is electrically connected to one end of either shading coil. In like manner, the two projections carried, respectively, by the two other elements are made from current conducting material, preferably silver plated brass, and are either insulated from their supporting elements or, if the elements themselves are made from metal, they are mounted on insulated supports. Each of the projections is then connected electrically to the other end, respectively, of one of the shading coils. When both projections are in contact with said lever both shading coil circuits are closed, and, since the motor cannot rotate in both directions at the same time, it remains stationary. Failure of one projection to make contact with said lever opens one shading coil circuit, and the motor thereupon rotates in a direction determined by the other shading coil circuit which remains closed. Failure of the other projection to make contact with said lever will, obviously, cause the motor to rotate in the opposite direction. By making the electrical connection properly these directions can be so chosen that the system always tends to return to the stationary condition in which the lever is simultaneously in contact with both projections.

As in all servomotors, suitable precautions must be taken to prevent the system from oscillating, but I have found that, if the sliding elements are moved with a moderate speed not exceeding approximately 1″ per second, the inherent friction of the gear train which necessarily connects the motor shaft to the sliding element is quite sufficient to insure stability of the system. For a more detailed discussion of the theory of servomotors in general, I wish to refer to the extensive literature now in existance; for example, LeRoy A. MacColl's "Fundamental Theory of Servomechanisms," D. Van Nostrand Co., New York. On page 127 of this book is an extensive bibliography on the general literature on servomotors.

As we shall see, the nomographs used in the computing device which forms part of this invention are all used as multiplication machines. A nomograph suitable for this purpose comprises two scales which are parallel to each other and a third scale which intersects the two first named scales. The two known magnitudes are represented on one of the parallel scales and on the third scale, respectively, and the unknown magnitude is represented on the second of the parallel scales. For reasons which have been fully explained in the aforementioned application No. 713,610, the scale divisions of the two parallel scales are uniform, but the third scale which intersects the two parallel scales receives non-uniform divisions. In this particular case, the non-uniformly divided scales are used to represent the "$m$" and "$a$" factors and in this case the non-uniform scale divisions are of no particular disadvantage. For convenience, the third scales which intersect the two parallel scales are chosen to be at right angles thereto, but this is merely a convenient disposition and other angles may theoretically be chosen if so desired.

The computing device consists of three parts. The first part serves to compute $$f(\varphi),\ f(\varphi+120°)\ \text{and}\ f(\varphi+240°)$$

as functions of $\varphi$ and comprises either a crankshaft with three cranks which are out of phase with each other by 120° or a cam shaft with three cams which again are out of phase by 120° with respect to each other. The second part consists of three mechanized nomographs which multiply the three functions computed by the first part with the same factor "$m$." The third part contains another set of three mechanized nomographs which multiply the three magnitudes $$1+mf(\varphi),\ 1+mf(\varphi+120°)\ \text{and}\ 1+mf(\varphi+240°)$$

with the factor "$a$." No separate computing device is necessary to obtain $$1+mf(\varphi),\ 1+mf(\varphi+120°)\ \text{and}\ 1+mf(\varphi+240°)$$

from $mf(\varphi)$, $mf(\varphi+120°)$ and $mf(\varphi+240°)$, respectively, since this can be done simply by shifting the scales between the nomographs of the second part and the corresponding nomographs of the third part by a distance corresponding to unity.

The geometric relations and proportions of such a device are shown in the diagram of Fig. 11 which shows schematically three cranks 80, 81 and 82, driving by means of three connecting rods 83, 84 and 85, three members 86, 87 and 88. Each of these members is assumed to be of the length $L_1$ and its upper end indicates upon a scale 89, 90, 91, respectively, the corresponding sine values. In addition to the scales just mentioned, the three nomographs of this set comprise three scales 92, 93 and 94 which are calibrated in "$m$" values, and three scales 95, 96 and 97 on which the values of the three results $$m \sin \varphi$$
$$m \sin (\varphi+120°)$$
$$m \sin (\varphi+240°)$$

can be read. Since the "$m$" values for all three nomographs are identical, the corresponding mechanical members are, in reality, as will be seen, mechanically connected with each other.

These results are then fed by means of members 100, 101 and 102 into the second set of nomographs situated, respectively, directly above the first named set of nomographs. The connecting members 100, 101 and 102 are all of the same length $L_2$, and their upper ends indicate on scales 103, 104 and 105 the values.

$$1+m \sin \varphi$$
$$1+m \sin (\varphi+120°)$$
$$1+m \sin (\varphi+240°)$$

In other words, corresponding points of scales 103, 104 and 105 are always made larger by one than the corresponding points of scales 95, 96 and 97.

The upper set of nomographs comprises in addition to the scales 103, 104 and 105 just mentioned, scales 106, 107 and 108 for the "$a$" values and scales 109, 110 and 111 for the $t_R$, $t_G$ and $t_B$ values, respectively. The "$a$" values for all three nomographs are always identical so the corresponding mechanical members will again be connected to each other.

All three nomographs work in the usual manner, i. e., straight lines drawn through all three scales coordinate values which belong together, and in this manner, for example, the straight line 120 will indicate upon scale 97 the result $m \sin \varphi$ depending upon the $\sin \varphi$ values selected on scale 91, and the "$m$" value selected on scale 89.

In like manner, the other straight intersecting lines which coordinate corresponding scale values for the other nomographs are called 121, 122, 123, 124, and 125, respectively.

The mechanical design of the computing machine built according to the diagram of Fig. 11 can be seen in Fig. 4. The three cranks 180, 181, and 182 are fastened to the common crankshaft 179 and drive, by means of connecting rods 186, 187 and 188, the three slidable members 189, 190, and 191. These members are supported in a suitable manner, for example, by grooved rollers 178, as shown. These slidable members carry at their respective upper end the pivoted levers 220, 221, and 222 which are all biased by springs not shown in the drawings, so that they tend to rotate in a counter-clockwise direction around their supporting pivots. These pivoted levers make, by means which will be described below, simultaneous contact with two triangular projections each. For example, pivoted lever 220 will be maintained in simultaneous contact with projections 200' and 192'. In like manner, pivoted lever 221 makes simultaneous contact with projections 201' and 193'. Lever 222 contacts simultaneously projections 202' and 194'.

The pivoted levers and the projections are both made from current conducting material and are insulated from their supports. They are electrically connected to flexible wires which are not shown in Fig. 4, but which are schematically shown in the circuit diagram of Fig. 20. In this manner, the pivoted levers as well as the projections form part of the electrical circuit by which the servomotors, to be described later, are operated.

The projections 200', 201' and 202' are, respectively, carried by slidable members 200, 201 and 202. Teeth are milled into the left side of these members, forming a gear rack which is indicated in Fig. 4 by dotted lines. These gear racks are in operative engagement with gears 300, 301 and 302 which are, in turn, driven by the servomotors already mentioned. In addition to these gears, the sliding members 200, 201 and 202 are supported by grooved rollers 299.

The projections 192', 193' and 194' are carried by a three-pronged member 192 supported by two grooved rollers 298 and which carries on its upper surface a gear rack which is again indicated by dotted lines and which is engaged by a gear 297. The three-pronged member 192 represents the magnitude "$m$" which is thereby simultaneously adjusted for all three nomographs of the lower row. The gear 297 can be adjusted manually by means of a handwheel 297' which is visible in Fig. 1.

The members 200, 201 and 202 carry the pivoted levers 223, 224 and 225, respectively. These levers are again spring biased by springs, not shown, and have the tendency to rotate in a clockwise direction. The lever 223 is maintained in simultaneous contact with projections 209' and 206'. Likewise, lever 204 contacts projections 210' and 207', and lever 225 contacts projections 211' and 208'.

Projections 209', 210' and 211' are carried, respectively, by members 209, 210 and 211. The left side of these members is again equipped with teeth forming a gear rack and is, respectively, engaged by gears 303, 304 and 305. These gears are again driven by three servomotors. Additional support for members 209, 210, 211 is provided by two grooved rollers 291 for each member.

Projections 206', 207' and 208' are fastened to, but insulated from the three prong member 206 which is supported by two grooved rollers 296, carries gear teeth on its upper surface and can be shifted horizontally by gear 295 which, in turn, is actuated by a handwheel 295' visible in Fig. 1. The three prong member 206 represents the magnitude "$m$" in all three nomographs of the upper row.

Fig. 6 is a cross-sectional view along the plane of line 6—6 in Fig. 4 and shows the three servomotors 310, 311 and 312 which, respectively, drive gears 300, 301 and 302. This is done by means of worms 313 engaging worm gears 314 which are fastened to shaft 315 which, in turn, carries the aforementioned gears 300, 301 and 302.

The motors are of the so-called shaded pole type and comprise a stack of laminations 316, field coils 317, 318 and 319, and two shading coils each, which are not visible in Fig. 4 but which are represented in the circuit diagram of Fig. 20. These shading coils are designated as 317', 317'', 318', 318'', and 319' and 319''. The motor will rotate in a clockwise or a counter-clockwise direction, depending upon which of the shading coils is closed and which one is open. If both are simultaneously opened or simultaneously closed, the motor will remain stationary.

A second set of servomotors 320, 321 and 322 is shown in Fig. 7 which is a cross-sectional view along the plane of line 7—7 in Fig. 4. These motors and their respective worm gear drives are in all respects identical to the motors just described. In the diagram of Fig. 20 it can be seen that these motors have field coils permanently connected to an A. C. line, 323, 324 and 325, and shading coils 323' and 323'', 324' and 324'', and 325' and 325''.

The wiring diagram of the servomotors can be seen in Fig. 20. All field coils 317, 318, 319, 323, 324 and 325 are connected in parallel permanently to an A. C. line shown in dotted lines. The connection of the shading coils are such that one terminal of one shading coil of the motor is connected to one end of the other shading coil of the same motor and both are conductively connected to the pivoted lever of the mechanized nomograph which is served by this motor. The other end of the two shading coils are, respectively, connected to two projections with which this pivoted lever is supposed to maintain contact. For example, one end of shading coils 317' and 317'' are connected to pivoted lever 220 and the other ends of these shading coils are, respectively, connected to projections 200' and 192'. All connections of the other motors are made in like manner as indicated in the diagram in Fig. 20. The connections must, of course, be so chosen that the system always has the tendency to return into the stationary position where both the shading coils are simultaneously closed by simultaneous contact of the pivoted lever with the two projections. The levers are spring biased and have the tendency to rotate; for example, lever 220 will rotate in a counter-clockwise direction. It will stop rotating as soon as it makes contact with either projection 200' or projection 192', depending upon which it happens to strike first. This closes one of the shading coil circuits, but leaves the other one open, causing the motor to rotate in such a direction that member 200 is either raised or lowered until it reaches the position in which projections 200' and 192' simultaneously close both shading coils 317' and 317'', whereupon the motor will come to a standstill. All other nomographs will be actuated by their respective servomotors in like manner.

Fig. 10 is a vertical cross-sectional view along the plane of line 10—10 in Fig. 7, showing another view of the three servomotors 320, 321 and 322, respectively. A vertical view through the other three servomotors shown in Fig. 6 would be, of course, of identical appearance.

An alternate arrangement whereby the first slidable members of the computing device 189, 190 and 191 are driven by three cams instead of the three cranks shown in Fig. 4, has been shown in Figs. 18 and 19. In this case, shaft 179 supports the three cams 460, 461 and 462 which are in contact with cam following rollers 463, 464 and 465. These rollers, in turn, are affixed to the members 189, 190 and 191, respectively.

The three cams are of identical shape but are angularly offset with respect to each other by 120°. The preferred shape of these cams can be seen in Fig. 19. This shape comprises three portions, each extending over 120°, the first portion 466 being of constant radius, the second portion 467 being a spiral of the type that, in a system of polar coordinates, has a radius which increases in straight proportion to the angle, and the third portion which is a corresponding spiral with a decreasing radius. A cam of this type causes the parts of the computing device to move in a manner diagrammatically shown in Figs. 15, 16 and 17.

TIME SWITCHES

The design of the three time switches does not depart from conventional practice, i. e., an element moves with constant speed and the time is controlled by adjusting the stroke of said element. These elements are preferably driven by small synchronous motors of the type used for electrical clocks or the like. These motors are commercially available with built-in gear reductions of suitable ratios and also with a so-called magnetic gear shift by which the output shaft is automatically connected to the motor as soon as the motor is energized, but disengaged therefrom as soon as current ceases to flow through the motor. The moving element is then free to return to its starting position under the influence of a spring or some other force. Clockwork motors of this type, 400, 401 and 402 are shown in Figs. 7 and 8. These motors drive, respectively, arms 404, 405 and 406 which, at the end of their respective travels, make electrical contact with pins 407, 408 and 409. Mounted on the same shaft with these arms are grooved pulleys 410, 411, and 412 to which springs 413, 414 and 415 are fastened. These springs cause the aforementioned arms 404, 405 and 406 to return to their starting position as soon as the motors become deenergized.

Means must be provided to adjust the length of the rotary travel of arms 404, 405 and 406 in such a manner that their respective travel times are in agreement with the exposure times determined by the relative positions of members 209, 210 and 211 of the computing device, see Figs. 4 and 11. The simplest way to do this is to choose the diameter of gears 303, 304 and 305 large enough so that they make no more than one full revolution. It then becomes possible to arrange the output shafts of the timer motors co-axial with the shafts of said gears, and in this manner the exposure times of the three time switches can be automatically adjusted in an extremely simple manner by the computing device described in the preceding paragraph.

This arrangement can be seen in Figs. 7, 8 and 9. Mounted on the same shaft as gears 303, 304 and 305 are arms 420, 421 and 422. These arms carry, respectively, pins 424, 425 and 426. Before the timer motors 413, 414 and 415 are energized, arms 404, 405 and 406 are biased by springs 413, 414 and 415 which cause these arms to rotate in a counterclockwise position until they come in contact with aforementioned pins 424, 425 and 426, or, in other words, the position of these pins determines the angle which arms 404, 405 and 406 have to travel before they meet, respectively, pins 407, 408 and 409.

The electrical circuit of the time switches is shown in Fig. 21. This circuit is merely a representative example and can, of course, be widely modified. In the interest of convenience, however, the circuits of the three time switches are interlocked in such a way that upon release of the first time switch the entire assembly performs automatically three consecutive exposures of the times determined respectively and set automatically by the computing device as described.

The three synchronous motors which drive the time switches 400, 401 and 402 are merely indicated by simple circles on this diagram. The output shafts are denoted by dotted lines which connect the motors with arms 404, 405 and 406. The position of the pins 424, 425 and 426 determines in the manner already described the angular travel of these arms before they, respectively, make contact with parts 407, 408 and 409.

Associated with each synchronous motor are two relays, each of which actuates one or more contacts. Associated with motor 402 are relays 430 and 431, associated with motor 401 are relays 432 and 433, and associated with motor 400 are relays 434 and 435.

The contacts actuated by these relays are numbered 440 to 451 and perform the following functions:

Relay 430

*Contact 440.*—This is a normally open contact to which the starting push button 452 is connected in parallel. A momentary closing of the normally open push button 452 energizes the relay, closing contact 440 which thereafter functions as a "hold-in" contact, keeping relay 430 closed even after the operator relinquishes the normally open starting push button 452.

*Contact 441.*—This is a normally open contact through which the lamp of the printer or enlarger is supplied with current when relay 430 is energized. This contact is connected in parallel with two similar contacts 445 and 448 which are actuated by the two other relays 432 and 434.

Relay 431

*Contact 442.*—This is a normally open contact, the duty of which is to keep relay 431 energized as soon as a circuit is closed by rotating arm 406 coming in contact with part 409. This contact is maintained even after contact between 406 and 409 ceases to exist after the return of the motor 402 into its starting position.

*Contact 443.*—This is a normally closed contact which is in series with the coil of relay 430. As soon as relay 431 is energized, this contact opens, deenergizing relay 430 and therewith motor 402 and the lamp of the enlarger.

*Contact 444.*—This is a normally open contact which is closed as soon as relay 431 is energized. Its function is to initiate the second exposure controlled by motor 401 and it performs the same function relative to motor 401 that the manually controlled push button 452 performs relative to motor 402.

Relay 432

*Contact 445.*—This is a normally open contact which energizes the lamp of the enlarger during the second exposure which is controlled by motor 401. Relay 432 does not need a "hold-in" contact since contact 444 described above remains closed for the balance of the exposure cycle.

Relay 433

*Contact 446.*—This is a normally open contact which becomes closed after relay 433 is energized by contact between arm 405 and stop pin 408. It is a "hold-in" contact which keeps relay 433 energized for the balance of the cycle, i. e., even after contact between 405 and 408 is broken when motor 401 returns into its starting position.

*Contact 447.*—This is a normally closed contact which is in series with relay coil 432. As soon as relay 433 becomes energized, this contact opens, deenergizing relay 432 and motor 401, thereby terminating the exposure controlled by this motor.

*Contact 448.*—This is a normally open contact which, in turn, initiates the third exposure controlled by motor 400.

Relay 434

*Contact 449.*—This contact is in parallel with contacts 448 and 441 and controls the lamp of the enlarger during the third exposure.

Relay 435

*Contact 450.*—This is a normally open contact which becomes closed as soon as relay 435 receives current, due to contact between arms 404 and pin 407 at the end of the third exposure. In other words, it is a "hold-in" contact with respect to relay 435.

*Contact 451.*—This is a normally closed contact in series with relay 434. It opens when relay 435 becomes energized and terminates the third exposure by deenergizing relay 434 and motor 400.

It can be seen that at the end of an exposure cycle, relays 431, 433 and 435 remain energized through the respective "hold-in" contacts 444, 446 and 450. It, therefore, becomes necessary to provide means by which these three relays can be deenergized so that the entire system can be ready for a new exposure cycle. This is done by the normally closed push button 453. A momentary depression of this push button by the operator interrupts the circuit for the three relays 431, 433 and 435 thereby resetting the entire network and rendering it ready for a new exposure cycle for three exposures.

Parallel to the motors 400, 401 and 402 are the three electromagnetic filter actuating means 66, 67 and 68 which were described in an earlier paragraph and which are shown in Figs. 2 and 3. These filter actuating means in the preferred example shown in these figures are small motors which are schematically shown as coils in Fig. 21. Due to this arrangement the respective filters of one of the three primary colors are energized for each of the three exposures, i. e., at the same time when the timer motors for said exposures are running.

INDICATING DEVICE

In order to assist the operator to select conveniently and quickly the direction and magnitude of a necessary color correction, this invention comprises an indicating device. Two modifications of this device are shown in Figs. 4 and 5, and Fig. 18, respectively.

The design of this indicator is based on the use of a triangular chromacity diagram. A diagram of this type contains all conceivable color mixtures of the three primary colors in such a way that each color has its full intensity in one of the corners of the triangle and decreases in intensity towards the side of the triangle which is opposite said corner, said intensity becoming zero at said side. Consequently, this triangle will show pure red, blue and green colors in the three corners, a neutral gray color in the center and color mixtures of various compositions at other points. A diagram of this type is shown at the lower portion of Figs. 4 and 18. These diagrams are conveniently obtained by exposing a sheet of color print material in a suitable manner, the exposure being of full strength for the respective colors at the three corners and decreasing gradually towards the opposite sides. Devices and methods to produce these diagrams have been disclosed in my co-pending applications No. 690,687, issued as Patent 2,450,307, September 28, 1948, 690,688, issued as Patent 2,446,111, July 27, 1948 and 743,948, issued as Patent 2,446,112, July 27, 1948.

By means of a diagram of this type, the direction and the magnitude of a necessary color correction can be quickly determined by simply locating on said diagram two points, the color of which corresponds, respectively, to the actual color with which a certain point has been produced on a real but somewhat defective print, and the desired color with which said point should have been reproduced on an ideal print. A line connecting the two points determines the direction of the color correction, and the distance between the two points determines its magnitude.

The simplest application of this principle merely involves making an exposure on the color print material which the operator wants to use, by exposing it to three equal exposures of the three primary colors. If this print turns out to be a neutral gray, no correction is necessary; otherwise a point can be located on the chromacity diagram which has the same color shade as the print, and a line connecting said point to the center of the triangle gives then the direction, and the distance of said point from the center determines the magnitude of the necessary color correction.

Referring to Fig. 5, the chromacity diagram is mounted on a support 475. Above said support is arranged a rotatable element 476 which is held by a large annular bearing 477 and carries a transparent sheet 478. Engraved upon that sheet is an arrow 479 which denotes the direction of the color correction to which the computor has been adjusted. The angular bearing 477 is fastened to the baseplate of the computor by means of two studs 479'.

The circular element 476 is equipped on its circumference with gear teeth which are shown in Fig. 4. These gear teeth form a gear which is in engagement with a second gear 480 of the same diameter, and this gear 480 is in turn rotated by means of a smaller gear 481. This gear 481 is attached to a shaft 482 which, in turn, is rotated by a handwheel 482' shown in Fig. 1. The same mechanism also serves to rotate shaft 179 which actuates the first slidable element of the computing device either by means of cranks or by means of cams. As can be seen in Fig. 5, gear 450 is attached to a short shaft 485 which carries a bevel gear 486 at its lower end. Shaft 485 with the large spur gear 480 and the bevel gear 486 is supported in a bearing 487 which, in turn, is fastened to a trunnion 488 which, in turn, is fastened to the base of the computing device by two studs 489. Bevel gear 486 is in mesh with a second bevel gear 490 of the same diameter. This bevel gear is attached to shaft 179, and, it will be clear that by this arrangement, a rotation of handwheel 480' causes through spur gears 481 and 480 and bevel gears 486 and 490 a corresponding rotation of shaft 179 with the associated crank or cams. At the same time, a rotation of handwheel 482' also causes through spur gears 481, 480 and 477 the rotation of ring 476 and therewith of the transparent sheet 478 with the engraved arrow 479. The direction of this arrow then indicates directly the direction of the color correction. For example, if a print made with three equal exposures of red, green and blue light results in a shade of color which corresponds to the shade of the point X in the chromacity triangle of Fig. 4, it is merely necessary to rotate arrow 479 until it passes simultaneously point X as well as the center of the triangle, pointing, of course, in the direction of the center.

The same diagram can conveniently be used to gauge the necessary magnitude of the color correction. A number of concentric circles are shown in Fig. 4 which are calibrated respectively in values of "$m$." The center of the triangle corresponds to the value $m=0$, and the largest circle which touches the sides of the triangle corresponds to the value $m=1$, intermediate circles denote intermediate "$m$" values in accordance with the respective radii of the circle. It can be seen that in the chosen example, the point X has a location between $m=.75$ and $m=.50$ or the size of the necessary color correction is approximately $m=.625$. If now handwheel 279' is adjusted by means of the scale shown schematically in Fig. 1 to said "$m$" value, the computing device will automatically adjust the three exposure times in such a way that a point which with equal exposure times was printed with a color shade corresponding to the location X in the diagram is then, with the unequal exposure times as now adjusted by the computor, reproduced with neutral gray as represented by the center of the triangle.

The concentric circles as shown in Fig. 4 represent "$m$" values under the assumption of a sinusoidal relationship between three exposure times as schematically shown in Figs. 12, 13 and 14. If, instead of the sinusoidal relationship, the triangular relationship represented in Figs. 15, 16 and 17 is chosen, i. e., if the lower members of the computing device are driven by cams of the shape shown in Fig. 19, the concentric circles of Fig. 4 must be replaced by concentric triangles as shown in Fig. 18. Again, the center of the triangle represents $m=0$ and the largest triangle which now has the same size as the chromacity diagram itself represents the value $m=1$, intermediate triangles representing correspondingly intermediate values. It can immediately be seen that the range of color corrections which can be covered by a triangular relationship is larger than the range of color corrections which can be handled by the sinusoidal arrangement. In practice, this theoretical advantage is probably of limited value because a color transparency which can be printed only with the aid of such an exceedingly drastic correction will probably never yield a very pleasing print under any circumstances. The sinusoidal relationship as shown in Figs. 12, 13 and 14 and affected by the crank mechanism shown in Figs. 4 and 5 will, therefore, be in practice at least as satisfactory.

OPERATION

The operation of the device can be understood from the foregoing specification.

A transparency from which a print is desired is inserted into the printer or enlarger and said enlarger is then adjusted for the desired magnification ratio and focused in the usual manner. Details of this operation need not be described here.

The operator then estimates the direction and magnitude of a necessary color correction. As has already been mentioned, this is most simply done by exposing a sheet of color print material to three equal exposures of the three primary colors, tracing upon the chromacity diagram of the indicating device a point corresponding to the color shade thus obtained, provided said color shade departs from neutral gray, and noting the position of that point with respect to the center of the triangle which determines the direction, and the distance of that point from the center which determines the magnitude of the necessary color correction.

The device can now be adjusted accordingly. Referring to Fig. 1, handwheel 482' is turned by the operator until arrow 479 passes simultaneously through the point in the chromacity diagram described above, and through the center of the triangle, pointing, of course, towards the center. This establishes the direction of the color correction. The distance of the point from the center can then be measured by means of the figures super-imposed upon the chromacity diagram such as the circles shown in Fig. 4 or the triangles shown in Fig. 18, depending upon whether the computing device comprises a crank drive as shown in Fig. 4 or a cam drive as shown in Fig. 18. Handwheel 297' is then, by means of a scale, shown schematicaly in Fig. 1, adjusted to the "$m$" figure which corresponds to the distance just mentioned. This adjusts the device for the correct magnitude of the color correction.

Handwheel 295' is then adjusted. The position of this handwheel determines the total exposure time which, of course, equals the sum of the exposure times of the three part exposures with the three primary colors, respectively. In this manner, the overall density of the print can be adjusted. It is unimportant for the purpose of this invention by what means the adjustment of the total exposure time is arrived at. In accordance with present practice, it is usually estimated in accordance with the appearance of the transparency, although it could conceivably be more scientifically measured by photoelectric methods, as disclosed for example in my Patent No. 2,438,303, above mentioned.

The device is now ready for an exposure, a sheet of color print material is placed on the easel, and an exposure is initiated by the operator who depresses push button 452. With the circuit shown in Fig. 21, three consecutive exposures will automatically be obtained.

This method of obtaining automaticaly a triple exposure obviously presupposes color print material of the so-called monopack type. However, the method can be modified for the so-called separation process which comprises three separate prints on three separate sheets, by simply separating the three timers and initiating each exposure separately by a separate push button. Between exposures, of course, the sheets placed on the easel of the enlarger must be exchanged. After the exposures, the images printed on the three sheets are in the usual manner processed and super-imposed upon each other on a common white base. After the exposure or exposures have been finished, the entire device is reset by depressing push button 453.

From the foregoing, it will be clear that the operation of the device can be conveniently divided into two periods. The first is the adjustment period in which the computor performs automatically certain motions in consequence of the adjustment of the three handwheels 482', 297' and 295'. By means of these movements the three time switches are automaticaly adjusted to the proper times. The second period then comprises the three exposures which are performed by the three time switches which control the color filters as well as the light within the enlarger.

The mechanical function of the computing device can best be seen in Fig. 4 and the associated electrical operations can be traced with the aid of Fig. 20. The operator first adjusts the direction of the color correction by rotating the handwheel 482'. This motion is transferred through gears 481 and 480 and bevel gears 486 and 490 to shaft 179 which carries either three cranks, Fig. 4, or three cams, Figs. 18 and 19. These means adjust slides 189, 190 and 191 accordingly in such a way that they generally assume unequal positions but that the sum of their displacements remains constant.

The last named slides carry at the upper ends pivoted levers: for example, slide 189 carries pivoted lever 220. Due to the adjustment of the crankshaft the pivoted lever will be raised or lowered and it will be clear that it will then lose contact with one of the projections 192' or 200'. This, in turn, referring to Fig. 20, interrupts one of the circuits for shading coil 317' or 317''. Depending upon which of these circuits is open and which one remains closed, motor 317 will commence to rotate in one direction or the other, driving through the worm gear, shown in Fig. 6, gear 300, thereby raising or lowering element 200 which carries projection 200'. The motor will come to a standstill as soon as lever 220 makes contact with both projections 192' and 200' at the same time thereby energizing both shading coil circuits simultaneously. In like manner, by means of the servomotors and circuits shown in Fig. 20, element 201 is raised or lowered until lever 221 makes simultaneous contact with projections 201' and 193', and again element 202 is raised or lowered by its servomotor until pivoted lever 222 makes connections with projections 202' and 194'. The operator then rotates handwheel 297' until the device is adjusted to the desired "$m$" value. Rotation of handwheel 297' causes a corresponding rotation of gear 297 thereby shifting the three-pronged member 192 horizontally to the left or right. Member 192 carries projections 194', 193' and 192', and the simultaneous horizontal displacement of these projections causes, of course, the three levers 220, 221 and 222 to lose again contact with one of their respective projections, causing a second adjustment of members 200, 201 and 202 by their respective servomotors 317, 318 and 319 until simultaneous contact between each lever and its two projections is again established. The same action is repeated with respect to the upper set of three nomographs. For example, after this adjustment of handwheel 297', lever 223 will generally be out of contact with one of the projections 209' and 206'. This, referring to Fig. 20, opens one of the circuits of either shading coil 323' or 323'' causing motor 323 to rotate in one or the other direction, thereby lowering or raising element 209 until simultaneous contact is established between lever 223 and projections 206' and 209'. This simultaneous contact closes both shading coil circuits, causing the motor to cease rotating. The same adjustment, of course, is automatically performed by motor 324, with respect to element 210, and by motor 325, with respect to element 211.

A rotation of handwheel 295 adjusts the total exposure time, i. e., the sum of the three respective exposure times. Handwheel 295' rotates gear 295 which causes three-pronged member 206 to move horizontally to the right or left. Member 206 represents the "a" values and carries the three projections 206', 207' and 208'. The horizontal adjustment of these projections, of course, causes each of the three levers 223, 224 and 225 to lose contact with one of its projections, and this contact is reestablished by the three servomotors in the manner already described, i. e., by opening one of the shading coil circuits and causing the motor to rotate in one or the other direction until simultaneous contact is reestablished whereby both shading coil circuits are again closed simultaneously.

At the end of these three adjustments, elements 209, 210 and 211 assume positions which are in accordance with, and indicative of, the three individual exposure times which satisfy the conditions imposed upon the three exposure times by the three handwheels 295', 297' and 402' for the total density of the print and the magnitude and direction of the color correction, respectively. The position of these members or, more accurately, the angular position of the corresponding gears 303, 304 and 305 is utilized to adjust automatically the three time switches to the exposure times thus computed.

It can be seen in Fig. 7 that the rotation of gears 303, 304 and 305 causes a corresponding rotation of arms 420, 421 and 422 with the associated pins 424, 425 and 426. This, in turn, adjusts the position which the timer arms 404, 405 and 406 assume before the start of an exposure, i. e., it adjusts the angular travel which these arms have to perform during the exposure before they make contact with their respective stop pins 407, 408 and 409; see Figs. 4 and 21.

The device is now adjusted and ready for an exposure. It is assumed that, after the preceding exposure, the operator has reset the device by depressing push button 453. In order to initiate a new exposure, he now depresses push button 452 whereupon the device automatically performs three timed exposures in the following manner: The temporary closing of push button 452 energizes relay 430. This closes normally open contact 440 which remains closed even after push button 452 has been opened, i. e., 440 is a "hold-in" contact. It also closes normally open contact 441, energizing thereby the lamp 53 of the enlarger. The timer motor 402 is connected parallel to the relay 430 and thereby energized at the same time, causing arm 406 to rotate in a clockwise direction, Figs. 8 and 21. The time of the exposure, of course, depends upon the time necessary for said arm to perform the necessary rotary travel before striking stop pin 409. It can also be seen that the electro-magnetic filter shifting device 68 is energized together with relay coil 430 and synchronous motor 402 causing one of the color filters to be shifted into the beam of the enlarger light during the first exposure.

As soon as arm 406 makes contact with pin 409, relay 431 is energized. This causes normally open contact 442 to be closed which keeps relay 431 energized for the rest of the exposure cycle, i. e., even if motor 402 returns to its starting position, thereby interrupting the contact between 409 and 406. Energizing relay 431 also opens normally closed contact 443 which, in turn, deenergizes relay 430, motor 402 and filter shifting device 68, thereby terminating the first exposure. This, in turn, by opening contact 441 associated with relay 430 deenergizes also the lamp of the enlarger at the same time.

Contact 444 which is normally open is closed as soon as relay 431 is energized. This contact has the same relation to the second timer assembly as push button 452 has to the first one, i. e., it initiates the second exposure by energizing relay 432. Parallel to relay 432 is synchronous motor 401 and filter shifting device 67. Actuated by that relay is normally open contact 445 which again, as soon as relay 432 is energized, causes current to flow to the lamp 53 of the enlarger. No "hold-in" contact is necessary for relay 432 since contact 443 remains energized for the balance of the exposure cycle because relay 431 is kept energized by its own "hold-in" contact 442.

Motor 401 causes arm 405 to rotate until it strikes stop pin 408. This establishes a circuit which energizes relay 432, closing normally open contact 446 which is a "hold-in" contact keeping relay 433 energized for the balance of the exposure cycle, opening normally closed contact 447 which deenergizes relay 432, motor 401 and filter shifting device 67, thereby terminating the second exposure. Opening of relay 432, in turn, causes the opening of contact 445, thereby deenergizing the lamp of the enlarger. Contact 448 is closed when relay 433 is energized and this contact initiates the third exposure by energizing relay 434.

Motor 400 and filter shifting device 66 are energized simultaneously with relay 434, and this also closes normally open contact 449 thereby energizing the lamp 53 of the enlarger again. Motor 400 drives arm 404 until said arm makes contact with stop pin 407. This energizes relay 435, closing contact 450 which holds said relay energized for the balance of the exposure cycle, and opening normally open contact 451 which deenergizes relay 434, synchronous motor 400 and filter shifting device 66 directly, and the lamp of the enlarger indirectly by opening contact 449.

The entire triple exposure is now finished, but it can be seen that at this time, relays 431, 433 and 435 are still energized, being kept in this state by their respective hold-in contacts 442, 446 and 450. In order to reset the device, the right ends of the three relay coils 431, 433 and 435 are connected to a common wire into which the normally closed push button 453 is inserted. A momentary depression of this push button will open all three circuits simultaneously, causing the three relays 431, 433 and 435 to return simultaneously into the deenergized condition.

While the construction and operation of the device has been fully disclosed in the foregoing specifications, it will be emphasized that many design features can be widely changed while still within the scope of the appended claims. It has been pointed out that the function $f(\varphi)$, $f(\varphi+120°)$, and $f(\varphi+240°)$ can be widely chosen and that the sinusoidal and triangular functions described above are merely preferred choices. It has also been pointed out that the automatic circuit shown in Fig. 21 which performs three consecutive exposures automatically is merely a representative example of said circuit which can be widely modified and which, if so desired, can be replaced by three independently controlled circuits. Other modifications will readily occur to anybody skilled in the art.

I wish also to point out that this device can be readily adapted to and combined with a device to make color prints as disclosed in my above mentioned Patent No. 2,438,303, thereby improving the adjustment and control of said device.

What I claim as new, is:

1. A control device for photographic color printers and enlargers which include a source of light, comprising: three filters in three different colors, means to move said filters, one at a time, into an effective position within the beam of said source of light, three time switches, each adapted to control said source of light, and each operatively connected to one of said filter moving means; first control means adapted to adjust the sum of all three exposure times of said time switches; second control means adapted to add corrective amounts to some of said exposure times and deduct other corrective amounts from some others of said exposure times, including means to render the sum of all corrective amounts to be added equal to the sum of all corrective amounts to be deducted; third control means adapted to adjust the magnitude of said corrective amounts while keeping their ratio relative to each other constant; and means to operate said three time switches consecutively; whereby said first control means adjust the general density of the print, whereby said second control means adjust the direction of a desired color correction by increasing the exposure times through some filters and decreasing the exposure times through some other filters, and whereby said third control means adjust the magnitude of said desired color correction.

2. A device according to claim 1, including a computing device operatively connected to said three control means and adapted to compute the three respective exposure times of said three time switches according to the formula $$t_R = a(1 + m.f(\varphi))$$

$$t_G = a(1 + m \cdot f(\varphi + 120°))$$

$$t_B = a(1 + m \cdot f(\varphi + 240°))$$

where $t_R$, $t_G$ and $t_B$ are the three exposure times through three different filters, respectively, $a$ is a factor adjusted by said first control means, $f(\varphi)$ is a function of an angle $\varphi$, said angle being adjusted by said second control means and said function being such that at all times $$f(\varphi) + f(\varphi + 120°) + f(\varphi + 240°) = 0$$

and $m$ is a factor adjusted by said third control means, said computing device comprsing three members displaceable in accordance with $t_R$, $t_G$ and $t_B$, and including means operatively connected to said members and adapted to adjust the exposure times of said three time switches automatically to $t_R$, $t_G$ and $t_B$, respectively.

3. A device according to claim 1, including a computing device operatively connected to said three control means and adapted to compute the three respective exposure times of said three time switches according to the formula $$t_R = a(1 + m. \sin \varphi)$$

$$t_G = a(1 + m. \sin \varphi + 120°)$$

$$t_B = a(1 + m. \sin \varphi + 240°)$$

where $t_R$, $t_G$ and $t_B$ are the three exposure times through three different filters, respectively, $a$ is a factor adjusted by said first control means, $\varphi$ is an angle adjusted by said second control means, and $m$ is a factor adjusted by said third control means, said computing device comprising three members displaceable in accordance with $t_R$, $t_G$ and $t_B$, and including means operatively connected to said members and adapted to adjust the exposure times of said three time switches automatically to $t_R$, $t_G$ and $t_B$, respectively.

4. A device according to claim 1, including a computing device comprising two sets of three multiplication mechanisms each, each of said mechanisms including two displaceable input elements and one displaceable output element; the mechanisms of the first set including first input elements representing, respectively, the magnitudes $f(\varphi)$, $f(\varphi + 120°)$ and $f(\varphi + 240°)$, the sum of all three magnitudes being constant at all times, said first input elements connected to, but out of phase, with each other, including means under the control of the operator to adjust said first input elements simultaneously by said second control means, second input elements representing the factor $m$, said second input elements connected to each other and including means to adjust said second input elements simultaneously by said third control means, and first output elements representing, respectively, the magnitudes $m.f(\varphi)$, $m.f(\varphi + 120°)$, $$m.f(\varphi + 240°)$$

the mechanism of the second set including third input elements representing, respectively, the magnitudes $1 + mf(\varphi)$, $1 + mf(\varphi + 120°)$ and $1 + mf(\varphi + 240°)$, said third input elements operatively connected to the respective first output elements and being adjusted by them automatically, fourth input elements representing the factor $a$, said fourth output elements connected to each other and including means under the control of the operator to adjust said fourth input elements simultaneously by said first control means, and second output elements, representing, respectively, the results $a(1 + mf(\varphi))$, $a(1 + mf(\varphi + 120°))$, and $a(1 + mf(\varphi + 240°))$, each of said second output elements operatively connected to one of said time switches and adapted to adjust its exposure time automatically to the value, respectively, represented by one of said results.

5. A device according to claim 1, including a computing device comprising two sets of three multiplication mechanisms each, each of said mechanisms including two displaceable input elements and one displaceable output element; the mechanisms of the first set including first input elements representing, respectively, the magnitudes $\sin \varphi$, $\sin (\varphi + 120°)$ and $\sin (\varphi + 240°)$, said first input elements connected to, but out of phase, with each other, including means under the control of the operator to adjust said first input elements simultaneously by said second control means, second input elements representing the factor $m$, said second input elements connected to each other and including means to adjust said second input elements simultaneously by said third control means, and first output elements representing, respectively, the magnitudes $m \sin \varphi$, $m \sin (\varphi+120°)$, and $m \sin (\varphi+240°)$; the mechanisms of the second set including third input elements representing, respectively, the magnitudes $1+m \sin \varphi$, $1+m \sin (\varphi+120°)$ and $1+m \sin (\varphi+240°)$, said third input elements operatively connected to the respective first output elements and being adjusted by them automatically, fourth input elements representing the factor $a$, said fourth output elements connected to each other and including means under the control of the operator to adjust said fourth input elements simultaneously by said first control means, and second output elements, representing, respectively, the results $a(1+m \sin \varphi)$, $$a(1+m \sin (\varphi+120))$$, and $a(1+m \sin (\varphi+240°))$, each of said second output elements operatively connected to one of said time switches and adapted to adjust its exposure time automatically to the values represented by said results.

6. A device according to claim 1, including a computing device comprising two sets of three mechanized nomographs each, each of said nomographs including two input elements and one output element, said elements displaceable along straight paths, the paths of the output and of one input element being parallel to each other and the path of the other input element intersecting the two first named paths, one of said elements carrying a pivoted straight arm, and the two other elements carrying one projection each, and each nomograph including means to maintain simultaneous contact between said straight pivoted arm and said two projections; the nomograph of the first set including first input elements representing, respectively, the magnitudes $f(\varphi)$, $f(\varphi+120°)$ and $f(\varphi+240°)$, the sum of all three magnitudes being constant at all times, said first input elements connected to but out of phase with each other, including means under the control of the operator to adjust said first input elements simultaneously by said second control means, second input elements representing the factor $m$, said second input elements connected to each other and including means to adjust said second input elements simultaneously by said third control means, and first output elements representing, respectively, the magnitudes $m.f(\varphi)$, $$m.f(\varphi+120°)$$

$m.f(\varphi+240°)$; the nomographs of the second set including third input elements representing, respectively, the magnitudes $1+mf(\varphi)$, $$1+mf(\varphi+120°)$$

and $1+mf(\varphi+240°)$, said third input elements operatively connected to the respective first output elements and being adjusted by them automatically, fourth input elements representing the factor $a$, said fourth output elements connected to each other and including means under the control of the operator to adjust said fourth input elements simultaneously by said first control means, and second output elements, representing, respectively, the results $a(1+mf(\varphi))$, $a(1+mf(\varphi+120°))$, and $$a(1+mf(\varphi+240°))$$

each of said second output elements operatively connected to one of said time switches and adapted to adjust its exposure time automatically to the value, respectively, represented by one of said results.

7. A device according to claim 1 including a computing device comprising two sets of three mechanized nomographs each, each of said nomographs including two input elements and one output element, said elements displaceable along straight paths, the paths of the output and of one input element being parallel to each other and the path of the other input element intersecting the two first named paths, one of said elements carrying a pivoted straight arm, and the two other elements carrying one projection each, and each nomograph including means to maintain simultaneous contact between said straight pivoted arm and said two projections; the nomographs of the first set including first input elements representing, respectively, the magnitudes $\sin \varphi$, $\sin (\varphi+120°)$ and $\sin (\varphi+240°)$, said first input elements connected to but out of phase with each other, including means under the control of the operator to adjust said first input elements simultaneously by said second control means, said means comprising a crank shaft with three crankpins angularly offset by 120° with respect to each other, each of said crankpins operatively connected to one of said first input elements, second input elements representing the factor $m$, said second input elements connected to each other and including means to adjust said second input elements simultaneously by said third control means, and first output elements representing, respectively, the magnitudes $m \sin \varphi$, $m \sin (\varphi+120°)$ and $m \sin(\varphi+240°)$; the nomographs of the second set including third input elements representing, respectively, the magnitudes $$1+m \sin \varphi, 1+m \sin (\varphi+120°)$$

and $1+m \sin (\varphi+240°)$, said third input elements operatively connected to the respective first output elements and being adjusted by them automatically, fourth input elements representing the factor $a$, said fourth output elements connected to each other and including means under the control of the operator to adjust said fourth input elements simultaneously by said first control means, and second output elements, representing, respectively, the results $$a(1+m \sin \varphi),$$
$$a(1+m \sin (\varphi+120°)),$$

and $$a(1+m \sin (\varphi+240°)),$$

each of said second output elements operatively connected to one of said time switches and adapted to adjust its exposure time automatically to the value, respectively, represented by one of said results.

8. A device according to claim 1, including an indicator adapted to indicate the direction of the color correction controlled by said second control means; said indicator comprising a triangular chromacity diagram and a direction indicating mark rotatably arranged in front thereof; said chromacity diagram containing mixtures of three primary colors in varying proportions, each of the corners of the triangles showing one pure primary color, the intensity of said color decreasing within the triangle in proportion to the distance from said corner, and becoming zero at the side of said triangle which is opposite to said corner, the intensity of all three colors being equal in the center of the triangle and rendering said center a neutral gray; and said mark operatively connected to said second control means and rotatable around an axis which coincides with the center of said triangle.

9. A device according to claim 1, including a computing device and an indicator adapted to indicate the direction of the color correction controlled by said second control means; said computing device operatively connected to said three control means and adapted to compute the three respective exposure times of said three time switches according to the formula $$t_R = a(1 + m.f(\varphi))$$
$$t_G = a(1 + m.f(\varphi + 120°))$$
$$t_B = a(1 + m.f(\varphi + 240°))$$

where $t_R$, $t_G$, and $t_B$ are the three exposure times through three different filters, respectively, $a$ is a factor adjusted by said first control means, $f(\varphi)$ is a function of an angle $\varphi$, said angle being adjusted by said second control means and said function being such that at all times $$f(\varphi) + f(\varphi + 120°) + f(\varphi + 240°) = 0$$

and $m$ is a factor adjusted by said third control means; said indicator comprising a triangular chromacity diagram and a direction indicating mark rotatably arranged in front thereof; said chromacity diagram containing mixtures of three primary colors in varying proportions, each of the corners of the triangle showing one pure primary color, the intensity of said color decreasing within the triangle in proportion to the distance from said corner, and becoming zero at the side of said triangle which is opposite to said corner, the intensity of all three colors being equal in the center of the triangle and rendering said center a neutral gray; and said mark operatively connected to said second control means and rotatable around an axis which coincides with the center of said triangle and adapted to make one full revolution when $\varphi$ is changed from $\varphi = 0$ to $\varphi = 360°$.

10. A device according to claim 1, including a computing device and an indicator adapted to indicate the direction, as controlled by said second control means, and the magnitude, as controlled by said third control means, of a color correction necessary to transform a selected shade of color into a neutral gray; said computing device operatively connected to said three control means and adapted to compute the three respective exposure times of said three time switches according to the formula $$t_R = a(1 + m.f(\varphi))$$
$$t_G = a(1 + m.f(\varphi + 120°))$$
$$t_B = a(1 + m.f(\varphi + 240°))$$

where $t_R$, $t_G$ and $t_B$ are the three exposure times through three different filters, respectively, $a$ is a factor adjusted by said first control means, $f(\varphi)$ is a function of an angle $\varphi$, said angle being adjusted by said second control means and said function being such that at all times $$f(\varphi) + f(\varphi + 120°) + f(\varphi + 240°) = 0$$

and $m$ is a factor adjusted by said third control means; said indicator comprising a triangular chromacity diagram, a plurality of figures superimposed thereupon, and a mark rotatably arranged in front thereof; said chromacity diagram containing mixtures of three primary colors in varying proportions, each of the corners of the triangle showing one pure primary color, the intensity of said color decreasing within the triangle in proportion to the distance from said corner, and becoming zero at the side of said triangle which is opposite to said corner, the intensity of all three colors being equal in the center of the triangle and rendering said center a neutral gray; said mark operatively connected to said second control means and rotatable around an axis which coincides with the center of said triangle and adapted to make one full revolution when $\varphi$ is changed from $\varphi = 0$ to $\varphi = 360°$, whereby the direction of said color correction can be determined by locating on said chromacity diagram a point of said selected shade of color, whereupon said direction can be adjusted by adjusting said second control means until said rotatable direction indicating mark passes said point on the chromacity diagram and the center of the triangle, pointing at said center; said plurality of figures being concentric, geometrically similar to each other and superimposed upon said triangular chromacity diagram, the largest of said figures touching the three sides of said triangle and denoting the value $m = 1$, the center of the triangle denoting the value $m = 0$, and intermediate figures denoting intermediate values of $m$ in accordance with the respective distances from the center of the triangle, whereby the magnitude of said color correction can be determined by noting the $m$ value of the superimposed figure nearest to the point on the chromacity diagram which has the selected shade of color, and whereupon said magnitude can be adjusted by adjusting said third control means to the $m$ value thus determined.

11. A device according to claim 1, including a computing device and an indicator adapted to indicate the direction, as controlled by said second control means, and the magnitude, as controlled by said third control means, of a color correction necessary to transform a selected shade of color into a neutral gray; said computing device operatively connected to said three control means and adapted to compute the three respective exposure times of said three time switches according to the formula $$t_R = a(1 + m.\sin \varphi)$$
$$t_G = a(1 + m.\sin (\varphi + 120°))$$
$$t_B = a(1 + m.\sin (\varphi + 240°))$$

where $t_R$, $t_G$ and $t_B$ are the three exposure times through three different filters, respectively, $a$ is a factor adjusted by said first control means, $\varphi$ is an angle adjusted by said second control means and $m$ is a factor adjusted by said third control means; said indicator comprising a triangular chromacity diagram, a plurality of circles superimposed thereupon, and a mark rotatably arranged in front thereof; said chromacity diagram containing mixtures of three primary colors in varying proportions, each of the corners of the triangle showing one pure primary color, the intensity of said color decreasing within the triangle in proportion to the distance from said corner, and becoming zero at the side of said triangle which is opposite to said corner, the intensity of all three colors being equal in the center of the triangle and rendering said center a neutral gray; said mark operatively connected to said second control means and rotatable around an axis which coincides with the center of said triangle and adapted to make one full revolution when $\varphi$ is changed from $\varphi = 0$ to $\varphi = 360°$, whereby the direction of said color correction can be determined by locating on said chromacity diagram a point of said selected shade of color, whereupon said direction can be adjusted by adjusting said second control means until said rotatable direction indicating mark passes said point on the chromacity diagram and the center of the triangle, pointing at said center; said plurality of circles being concentric, surrounding the center of said triangle and superimposed thereupon, the largest of said circles touching the three sides of said triangle and denoting the value $m=1$, the center of the triangle denoting the value $m=0$, and intermediate circles denoting intermediate values of $m$ in accordance with their respective radii, whereby the magnitude of said color correction can be determined by noting the $m$ value of the superimposed circle nearest to the point on the chromacity diagram which has the selected shade of color, and whereupon said magnitude can be adjusted by adjusting said third control means to the $m$ value thus determined.

ALFRED SIMMON.

REFERENCES CITED

The following references are of record in the file of this patent:

UNITED STATES PATENTS

| Number | Name | Date |
|---|---|---|
| 2,438,303 | Simmon | Mar. 23, 1948 |